May 16, 1967 S. H. CREED 3,319,679
STEM PULLING APPARATUS
Filed July 27, 1964 3 Sheets-Sheet 2
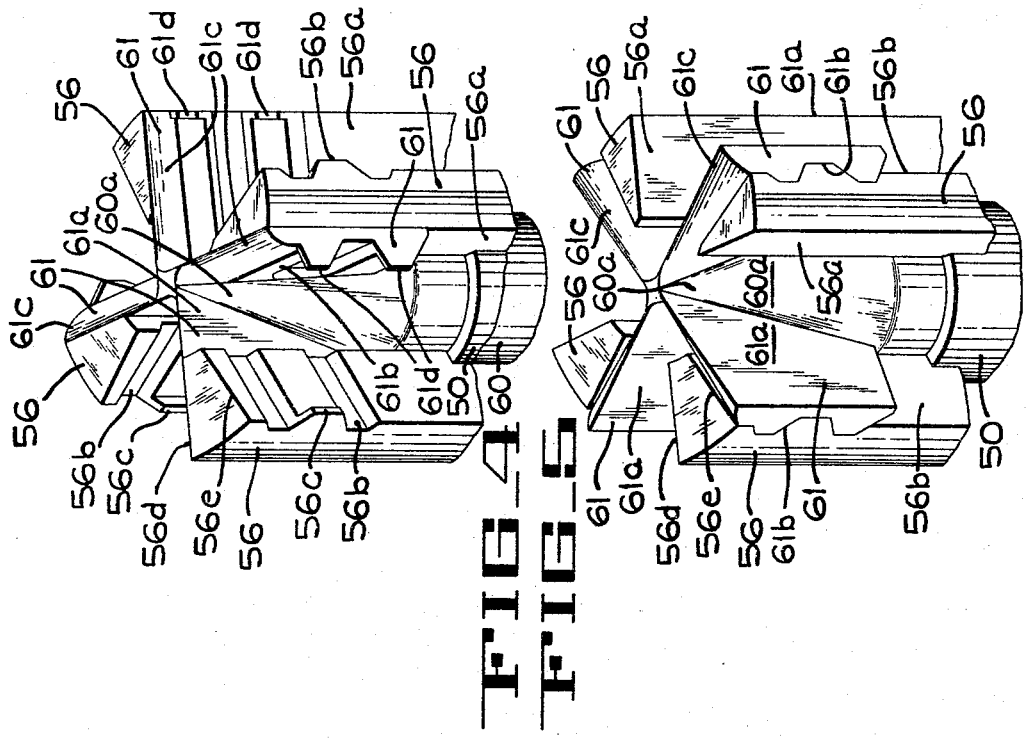
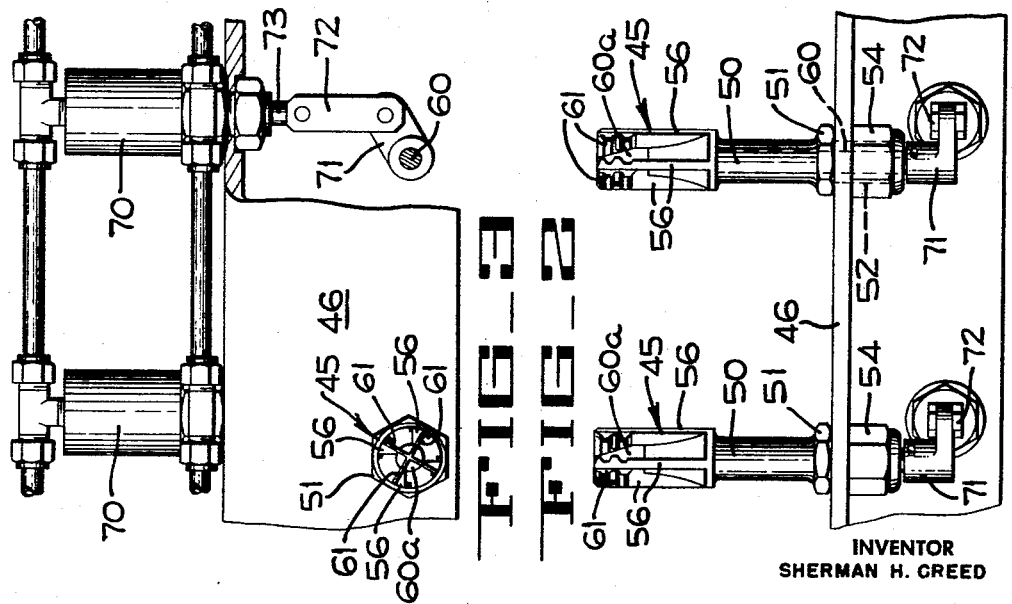
INVENTOR
SHERMAN H. CREED
BY Hans G. Hoffmeister
ATTORNEY

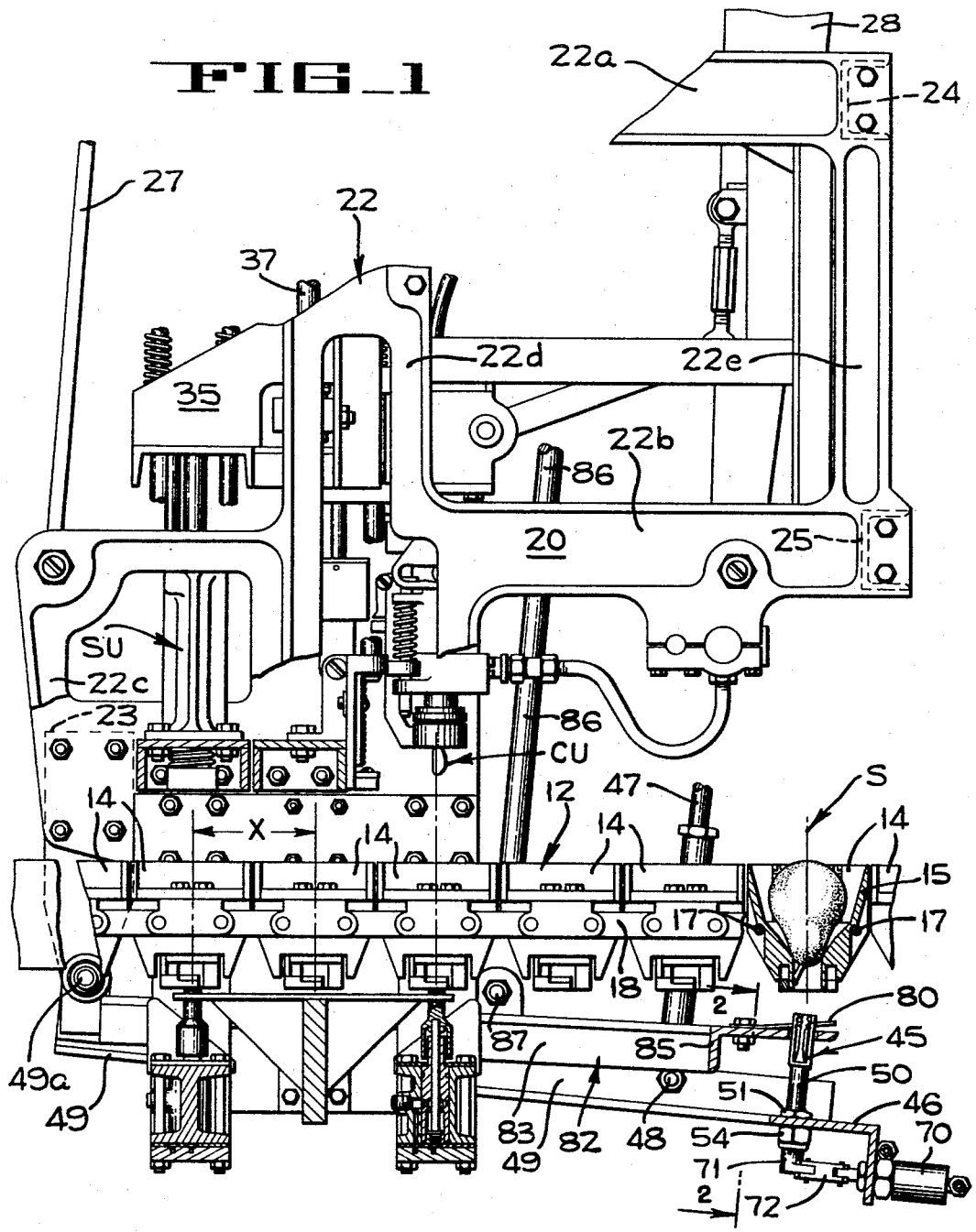

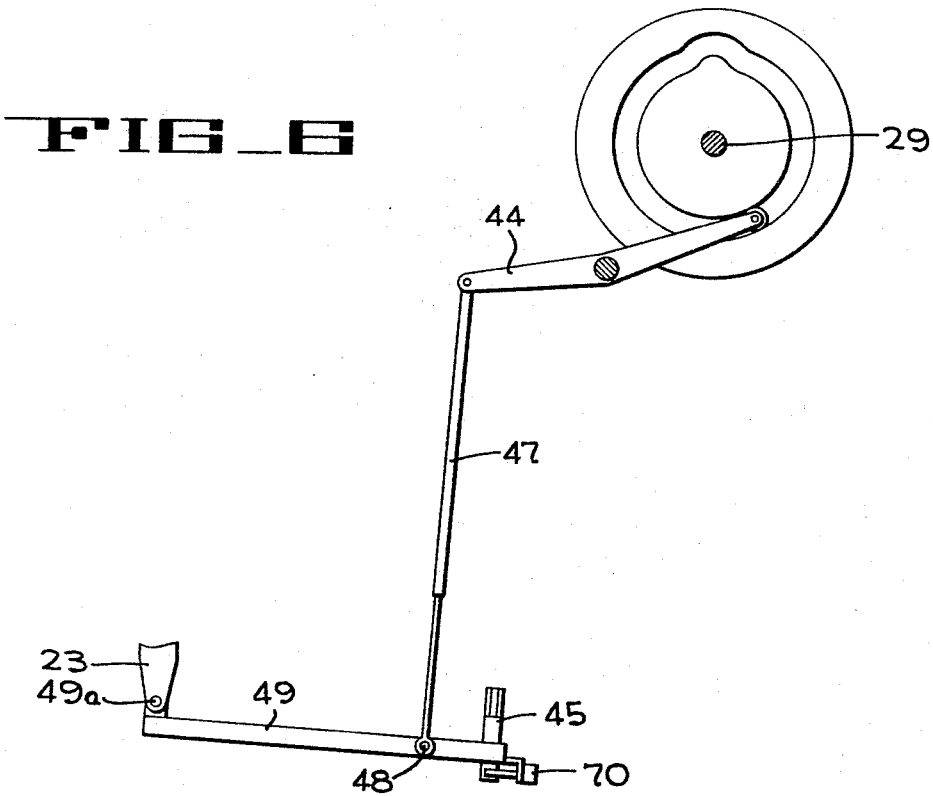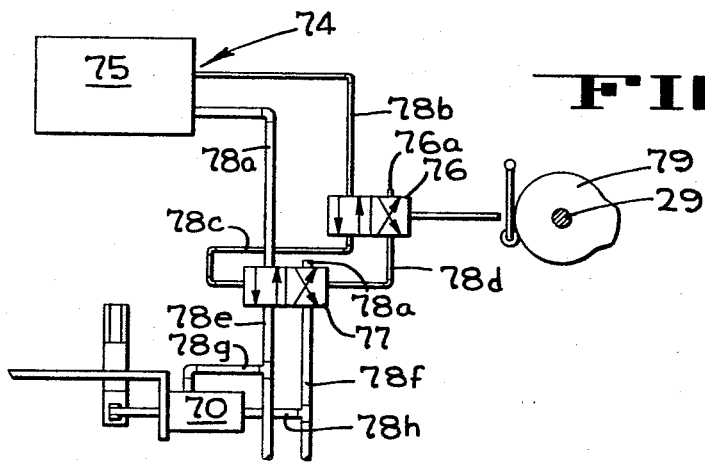

United States Patent Office 3,319,679
Patented May 16, 1967

3,319,679
STEM PULLING APPARATUS
Sherman H. Creed, San Jose, Calif., assignor to FMC Corporation, San Jose, Calif., a corporation of Delaware
Filed July 27, 1964, Ser. No. 385,303
6 Claims. (Cl. 146—55)

This invention pertains to apparatus for processing fruit or the like and more particularly concerns a mechanism for removing stems from fruit.

To prepare fruit such as pears for canning, it is necessary to remove the entire core of the fruit including the stem. Normally this is accomplished by means of a coring tube that is forced longitudinally through the pear to remove the material along the stem-blossom axis of the pear. This operation usually removes the end of the stem that projects from the pear, however, in some instances the end of the stem of the pear is disposed at an angle to the stem-blossom axis so that it projects from the pear at a point spaced from the axis. In such cases the coring tube severs the connection between the stem end and the core material and leaves the stem end projecting from the cored pear. This stem end must then be removed by hand trimming before the pear can be further processed.

It is therefore an object of the present invention to provide an improved apparatus for processing fruit such as pears.

Another object is to provide an efficient stem pulling mechanism.

Another object is to provide a machine for reliably coring and removing the stem from a pear.

Other and further objects and advantages will be apparent from the following description taken in connection with the accompanying drawings, in which;

FIGURE 1 is a fragmentary schematic side elevation of a part of a fruit processing machine incorporating the stem pulling mechanism of the present invention.

FIGURE 2 is an enlarged fragmentary front elevation of two stem pulling units of the present invention, the view being taken looking in the direction of arrows 2—2 of FIG. 1.

FIGURE 3 is a plan of the mechanism of FIG. 2, with parts broken away.

FIGURE 4 is an enlarged diagrammatic perspective view of the upper end of a stem pulling unit, particularly showing the stem gripping jaws in open position.

FIGURE 5 is a perspective similar to FIGURE 4 but showing the jaws in a closed position.

FIGURE 6 is a diagrammatic showing of the mechanism for raising and lowering the stem pulling mechanism of the present invention.

FIGURE 7 is a diagrammatic showing of the control circuit for the stem pulling units.

The stem pulling mechanism of the present invention is particularly adapted for use on fruit processing machines of the type disclosed in the pending applications of G. R. Anderson, Ser. No. 206,955 filed July 2, 1962 and of G. R. Anderson et al., Ser. No. 221,174 filed Sept. 4, 1962, both of said applications being assigned to the assignee of the present application. The present stem pulling mechanism is adapted to be installed in the machine of application Ser. No. 221,174 by mounting the present stemming unit on an oscillating arm in place of a fruit lifting unit, disclosed as being mounted on that arm in said application Ser. No. 221,174, without making any changes to the mounting of the arm. Accordingly, the mechanism for actuating the oscillating arm in timed relation with the other operating mechanisms of the machine is the same in the machine with which the present stem puller is associated as in the machine of application Ser. No. 221,174, and said mechanism will not be described in detail herein, it being understood that reference may be had to said applications Ser. No. 221,174 and Ser. No. 206,955 for a complete description of any detail of construction or operation that is not specifically described herein.

In general, the fruit processing apparatus of FIGURE 1 is part of a machine which receives whole peeled pears from a peeler, removes the cores from the pears and delivers the pears to a subsequent mechanism at which the pears may be split or subjected to a dicing operation. The machine includes an endless conveyor 12 that is made up of a plurality of transverse rows 14 of cups 15, each row containing a predetermined number of individual cups, such as eight. The transverse rows of cups are mounted on transverse rods 17 which hold the cups in adjacent relation and are operatively connected at each side of the machine to a power driven continuously-moving endless chain 18.

A carrier frame 20 is mounted above the endless chain for oscillating movement from left to right (FIG. 1). The frame is a rigid member which includes two side wall members 22 (only one being shown), each side member having horizontal portions 22a and 22b and vertical members 22c, 22d, and 22e. A bracket 23 is bolted to the outer face of each member 22c. The two side wall members 22 are interconnected to form a rigid structure by a plurality of rigid transverse tie members including channels 24 and 25. A pair of support arms 27 and 28 is pivotally connected to each side wall member 22, the two arms 27 being pivotally connected at their upper ends to a horizontal shaft (not shown) that is rotatably journalled in an upper portion of the main frame 30 of the machine, while the upper ends of the two arms 28 are integrally formed on a drive shaft that is also rotatably journalled in the upper part of the machine.

The drive mechanism that continuously moves the cup conveyor forwardly, that is, from left to right in FIG. 1, also rotates a camshaft 29 (FIG. 6) which is operatively connected to the drive shaft on which the carrier support arms 28 are formed. Accordingly, the carrier 20 is arranged to be oscillated from left to right between a rearward and a forward position in timed relation to the forward movement of the cup conveyor. During one revolution of the camshaft, the carrier frame makes one oscillation and the cup conveyor is advanced a distance equal to the distance between the vertical centerline of the cups of adjacent rows of cups, said distance being indicated by reference letter X in FIG. 1.

A support bracket 35 is mounted for vertical reciprocating movement on two vertical rods 37, one of which is secured to the inner side of each side wall member 22. A stemming unit SU and a coring unit CU are mounted on the support bracket 35 at stemming and coring stations respectively for vertical reciprocating movement therewith, the stemming unit being effective to force a hollow cylindrical stemming tube down through the pear to cut a clean cylindrical core out of the pear, and the coring unit being effective to cut out the seed cell of the pear. The vertical movement of the support bracket 35 and the stemming and coring units thereon is controlled by the same camshaft 29 that controls the oscillation of the carrier frame 22. Accordingly, the vertical movements of the coring and stemming units are coordinated with the forward movement of pears in the cups of the conveyor so that the coring and stemming units are first brought into vertical alignment with pears in the cups therebelow and are moved forwardly at the same speed as the pears as they move downwardly to stem and core the pears.

After the eight pears in a row of cups are cored, they continue their forward movement to a stem removing station S at which eight stem gripping units 45 (one only being shown in FIG. 1) are mounted on a transverse angle bar 46. Each stem-pulling unit 45 is disposed directly below and in vertical alignment with the central opening of a cup 15. The angle bar 46 is welded to the forward end of two spaced lifter arms 49 to form a lifter frame, each arm 49 being pivoted at its free end to one of the fixed brackets 23 by a pivot member 49a.

The lifter frame is raised and lowered by means of a plurality of lifting rods 47 (one only being shown), each of which is pivotally connected to one of the lifter arms 49 (FIG. 6) by a pivot bolt 48. At their upper ends, the lifting rods 47 are connected to a lever system 44 that is arranged to be actuated by the camshaft 29 that controls the movement of the carrier frame 22, the stemming unit SU, and the coring unit CU. The arrangement is such that, when a transverse row of cups arrives at station S, the stemming gripping units 45 are moved up into the lower end of the cups to engage the stem ends of the pears in the cups. If any pear in any cup has a stem disposed so far from the normal longitudinal axis that it was not removed by the stemming unit SU, the stem will be gripped by the associated stem gripper 45 and, during the subsequent downward movement of the gripper, the stem will be pulled out of the end of the pear.

Each of the stem gripping and pulling units 45 includes a stationary tubular outer housing 50 (FIG. 2) which has a nut 51 integrally formed thereon above a threaded lower end 52. The unit is locked on a horizontal ledge of the lifter frame member 46 by a nut 54. At its upper end, the tubular housing 50 has four equally-spaced, radially-disposed fixed clamp arms or jaws 56 (FIG. 5), each arm having a smooth wall or surface 56a and a grooved or corrugated surface 56b. Each grooved wall has a peripheral flange 56c (FIG. 4) formed thereon, and the upper surface of each arm 56 slants downwardly slightly from an upper edge 56d (FIG. 5) to a lower edge 56e.

An actuator shaft 60 (FIG. 2) is rotatably journalled in the central bore of the tubular housing 50. The shaft 60 has an upper conical surface 60a (FIG. 5) from which four jaws or arms 61 project in a generally radial direction, each arm having a flat surface 61a, and a grooved or corrugated surface 61b. The upper edge of each arm 61 is inclined, as by providing a downwardly curved surface 61c. If desired, this upper surface may be a flat beveled surface. Two peripheral flanges 61d (FIG. 4) are formed on each movable arm 61.

The movable arms 61 are normally disposed in the position of FIG. 4 with the flat surfaces 61a closely adjacent the flat surfaces 56a of the stationary arms 56. The movable arms 61 are arranged to be moved clockwise (FIG. 5) incident to rotary movement of the actuator shaft 60, said movement being brought about by a double-acting air-operated power cylinder 70 (FIGS. 1 and 3) which is operativly connected to shaft 60 through an arm 71 pinned to shaft 60 and a link 72 that is pivoted to the arm 71 and to the piston rod 73 of the cylinder 70.

The eight double acting cylinders 70 are connected in a pneumatic control system 74 (FIG. 7) that includes a source 75 of air under pressure, a pilot valve 76, a control valve 77 and connecting conduits 78a–78h. The pilot valve 76 has two settings. In the first setting, a pair of straight passages are aligned with conduits 78c and 78d to cause air from conduit 78b to pass through conduit 78c to shift the control valve 77 to its straight passage position for directing pressurized air from conduit 78a to the left end (FIG. 7) of cylinder 70, whereby the jaws of the stem gripping unit 45 are moved to open position. The pilot valve includes spring means for urging the valve to said first position and, accordingly, the jaws of the gripper ar normally held open.

The pilot valve 76 is moved to its second or cross-passage position by means of a cam 79 on camshaft 29 against the urgency of the above-mentioned spring means. When the pilot valve 76 is in the cross-passage position, the control valve 77 is moved to its cross-passage position so that air under pressure is directed from conduit 78a and conduit 78f to the right side of cylinder 70 to close the jaws of the gripper unit.

It will of course be understood that vent conduits 76a and 78a are provided in the valves 76 and 78. Also, it will be noted that the conduits 78e and 78f are, in effect, manifolds to which all eight cylinders 70 are connected.

Since the camshaft 29 also controls the raising and lowering of the stem pulling units, it is evident that the opening and closing of the jaws of the unit occurs in timed relation to the vertical movement of the units. The arrangement is such that, just as the stem-gripper units approach their upper position the cylinders 70 are energized to close the jaws of the units to grip the stems.

As described in the above-mentioned application Ser. No. 221,174, the cups 15 of the cup conveyor have pivoted walls which are moved toward to grip and center the pears positioned in the cup. Further, each cup is provided with cup shaped resilient washers for holding the walls of the cups in fruit gripping position during the processing of the fruit. After the fruit has been processed, the walls of the cup are pivoted away from each other by cup opening fingers 80 (FIG. 1) that are mounted on a lifter frame 82 which is pivoted on the pivot member 49a. The frame 82 includes two side arms 82 (one only being shown) and a transverse member 85 that mounts the cup opening fingers 80 and has a plurality of openings which permit vertical movement of the gripper units 45. The frame is raised and lowered by means of two lifter rods 86 (one only being shown) that are pivotally connected at 87 to each of the side arms 83. At their upper ends, the lifter rods are connected to a cam-actuated lever system that is controlled by the main cam which actuates the stem-gripper units.

During operation of the machine, the carrier frame 20 and the cup conveyor 12 are moved forward in synchronism with the stemming unit SU above one row of cups, the coring unit CU above another, and the stem pulling units 45 below a forward row of cups. During this forward movement of the frame 20, the gripper units 45 are raised upwardly so that the movable and stationary arms of the units project through the openings in the lower ends of the cups. It will, of course, be understood that the size of the central opening in each cup and the size of the generally circular area defined by the top of each gripper unit are coordinated with the forward speed of the cup conveyor 12 and the oscillating speed of the gripper units so that each gripper unit will be projected up into the associated cup and be lowered away from the cup without interfering with the forward movement of the cup conveyor. In one effective arrangement, the cup opening was 15/16 inch in diameter and the effective diameter of the gripper units was 7/8 inch.

When each gripper unit moves upwardly toward the associated cup, the movable arms 61 are in the position shown in FIG. 4 wherein a large open space is provided between the grooved surface 61b of the movable jaw and an opposed grooved surface 56b of a stationary jaw. If there is a stem on the lower end of the pear, it will be received directly into one of said open spaces between grooved surfaces, or will be guided into the spaces by the upper guide edges of the jaws. When the gripper arms of each gripper unit are near their uppermost position, air under pressure is directed to one end of the associated air cylinder to force the piston rod 73 out of the cylinder and cause clockwise rotation (FIGS. 3 and 4) of shaft 60. Accordingly, the grooved surface of each movable arm 61 is moved toward the opposed grooved surface of the adjacent stationary arm 56, and the stem is caught between one of the four sets of cooperating grooved surfaces, depending upon in which of the four openings it is disposed.

It will be noted in FIG. 5 that, when the arms are in closed position, the ridges or teeth defining the grooves of one arm are disposed in the grooves or partial grooves of the other arm. Since the arms of each gripper unit are held in closed position under air pressure, the stem is firmly gripped and will be pulled downwardly out of the pear as the gripper unit is moved downwardly. When the gripper unit has been lowered to a point at which it is clear of the cup, air is directed to the other end of the cylinder to force the piston rod back into the cylinder. As the movable jaws are swung counterclockwise with the shaft 60, the stem is released so that it can fall clear of the gripper unit. After the gripper units have started their downward movement, the frame 82 is raised to cause the fingers 80 to engage and open the cups to release the fruit so that it can be discharged from the machine.

While one embodiment of the gripper unit of the present invention has been illustrated wherein intermeshing grooved gripper surfaces are used, it will be evident that grooved surfaces that do not intermesh may be used. While the intermeshing grooves bend the stem and thus obtain a very effective grip on the stem, the non-intermeshing arms will depend upon the grip on the stem obtained by the indentations in the stem made by the ridges which, of course, can be relatively blunt or sharpened to a desired degree. Also, since the primary consideration is the obtaining of a firm grip on the stem when air pressure urges the arms toward closed position, arms having other roughened or irregular surfaces could be used for effectively gripping the stem when air under pressure is applied. Accordingly, in the claims the term "irregular" surface will be used generically to indicate any gripping surface that is adapted to frictionally or positively grip the stem when the arms are moved by a pressure means to closed stem-engaging position.

Having thus described my invention, what I claim as new and desire to protect by Letters Patent is:

1. In an apparatus for processing fruit, means for holding a fruit with its stem projecting from its stem end, a stem-gripping mechanism mounted for movement between a first position spaced from said fruit support means to a second position adjacent said fruit support means, said stem-gripping mechanism having a plurality of fixed gripping means each circumferentially spaced from one another and movable gripping means, means for holding said movable gripping means in open position spaced from said fixed gripping means, means for moving said stem-gripping mechanism to said second position to position the stem of the fruit between said fixed gripping means and said movable gripping means, and means for moving said movable gripping means to closed position adjacent said fixed gripping means when said gripping mechanism is in said second position.

2. In an apparatus for processing fruit, means for supporting a fruit with its stem projecting in a predetermined direction from said support means, a processing tool support member, means mounting said tool support member for movement toward and away from said fruit support means, a tubular body member mounted in upright position on said tool support member, a plurality of fixed jaws mounted on the free end of said body member, a shaft journalled for rotation in said body member and having an end portion projecting from the free end of said tubular body member adjacent said fixed jaws, second jaws secured to said end portion of said shaft, said second jaws being movable between an open position spaced from the fixed jaws on said body member and a closed position adjacent said fixed jaws incident to rotary movement of said shaft.

3. An apparatus according to claim 2 wherein the jaws on said body member and on said shaft are generally radially disposed relative to the axis of rotation of said shaft.

4. An apparatus according to claim 2 wherein the upper ends of said jaws are formed to provide guide surfaces for deflecting the stems of fruit into position between cooperating jaws.

5. An apparatus according to claim 2 wherein each jaw has a grooved surface and at least one radial flange.

6. In an apparatus for processing fruit, a fruit support cup having an opening in its lower wall into which the stem of the fruit in the cup may be received, a stem gripping mechanism mounted below said cup for vertical reciprocating movement between a lowered position spaced below the cup and a raised position wherein a portion of the gripping mechanism is projected into the opening in the cup, said gripping mechanism including a plurality of stationary radially disposed jaws and a plurality of movable radially disposed arms, each fixed arm being associated with a movable arm and cooperating therewith to grip the stem of a fruit in the cup when said gripping mechanism is moved to closed position, and means for moving said gripping mechanism to closed position for gripping the stem of a fruit in said cup when said gripping mechanism is in raised position.

References Cited by the Examiner

UNITED STATES PATENTS

| | | | |
|---|---|---|---|
| 1,403,946 | 1/1922 | Hachmuth | 146—55 |
| 1,876,051 | 9/1932 | Gardner | 146—55 |
| 1,890,676 | 12/1932 | Fox | 146—55 |
| 2,375,350 | 5/1945 | Coons | 146—55 |
| 2,389,961 | 8/1945 | Coons | 146—55 X |
| 2,759,509 | 8/1956 | Kelly | 146—55 X |

FOREIGN PATENTS 597,543  1/1948  Great Britain.

WILLIAM W. DYER, JR., *Primary Examiner.*

JAMES M. MEISTER, *Examiner.*